April 4, 1967

J. J. BRAMBLETT 3,312,046

RUBBER MOUNTED COTTON STRIPPER MEANS
FOR COTTON PICKER MACHINES

Filed Nov. 23, 1964

INVENTOR,
John J. Bramblett

BY Weatherford & Weatherford
Attys

April 4, 1967
J. J. BRAMBLETT
3,312,046
RUBBER MOUNTED COTTON STRIPPER MEANS
FOR COTTON PICKER MACHINES
Filed Nov. 23, 1964
2 Sheets-Sheet 2
FIG. 3
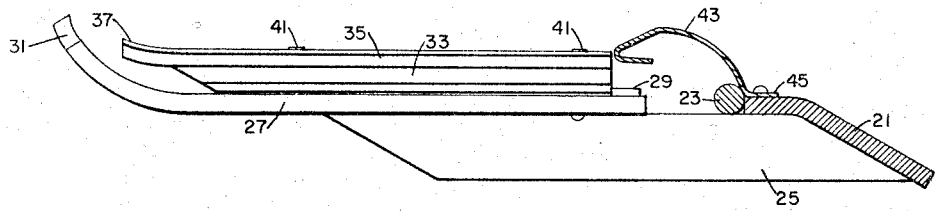
FIG. 4
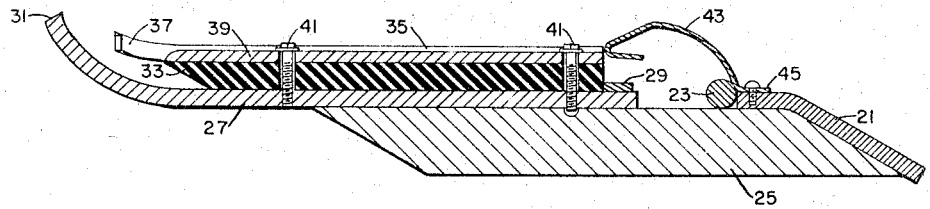
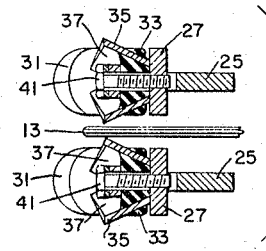
FIG. 5
FIG. 6
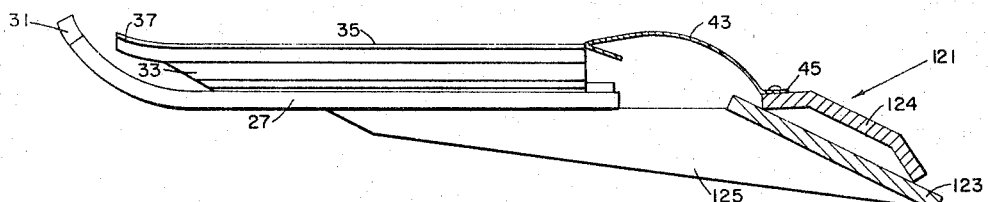
INVENTOR,
John J. Bramblett
BY
Weatherford & Weatherford
Attys

United States Patent Office 3,312,046
Patented Apr. 4, 1967

3,312,046
RUBBER MOUNTED COTTON STRIPPER MEANS FOR COTTON PICKER MACHINES
John J. Bramblett, Pine Bluff, Ark., assignor to Ben Pearson, Incorporated, Pine Bluff, Ark., a corporation of Arkansas
Filed Nov. 23, 1964, Ser. No. 413,143
8 Claims. (Cl. 56—42)

This invention relates to certain new and useful improvements in connection with mechanical cotton pickers of the type in which there are pluralities of horizontally disposed cotton picking spindles which are vertically spaced apart, and which are rotatably driven during travel in the cotton picker device in order to engage with the lint of the cotton, the strippers being provided for the purpose of separating the accumulated cotton lint from the spindle upon which accumulated. Many attempts have heretofore been made to provide cotton stripper means for removing the accumulated cotton from cotton picking spindles in devices of this general character, and all of the prior known devices have exhibited defects in opertaion so as to make them commercially undesirable and to demonstrate the necessity for improvement therein.

The principal problem which has been encountered has been due to the lack of true flexibility in the mounting of stripper bars of sufficient strength and rigidity to engage with the accumulated cotton upon the spindle to remove the same during operation of the device. Attempts have been made heretofore to provide leaf spring means engaging against cotton stripper bars, which bars are sandwiched between holder plates and mounting means, so as constantly to urge the bars outwardly toward the spindles passing therethrough, with no limitation being provided in these prior devices against the outward movement of the stripper bars so that, upon undue accumulations of cotton upon spindles, at times it has been possible for a given stripper bar to be detached from its supporting means and passed along with the cotton into the other mechanisms of the cotton picker, causing damage as well as requiring replacement. Other devices have been provided which merely furnished a rigid stripper bar positioned approximately to engage the accumulated cotton, but providing no means for adapting the same to conditions of wear or the like during the use of the device.

The present invention provides a novel concept of mounting of stripper bars for cotton picker machines in such a fashion as to overcome the prior shortcomings and to provide a highly efficient device readily usable, and in the event of necessity, readily susceptible of replacement, which is accomplished primarily by providing a resilient rubber-like mounting in which a pair of stripper bars is embedded, with the stripper bars in the pair diverging away from the mounting, and in which the unit comprising the stripper bars and the rubber mounting is attached to a mounting bar carried from a supporting post of the cotton picker and the rubber mounting is attached to the mounting bar by a holder plate which is engaged against the face of the rubber mounting and is interposed between the stripper bars, so that the stripper bars lie substantially alongside the holder plate. By the action of the holder plate against the rubber mounting based upon the mounting bar, the clamping screws or bolts which pass through the elements and engage into the mounting bar are effective to clamp the rubber mount between the holder plate and the mounting bar and to effect thereby an adjustment of the expansion laterally of the rubber mount subject to the tension applied thereupon by the tightening or loosening of the clamp belts.

While it has heretofore been considered desirable to provide air vent openings so that the air flow created by the suction used to exhaust detached cotton from the collecting location in the cotton picker unit after stripping from the cotton picker spindles, the present cotton picking device is further characterized by the provision of an elongated vertically disposed shield connected to the support means and extending rearwardly therefrom into adjacency with the stripper bar units so as substantially completely to block any flow of air through the root ends of the device and to eliminate the air flow therethrough, which air flow has proven to be unsatisfactory in the distribution of the discharged cotton and its removal from the collection area of the cotton picker.

The principal object of the present invention is to provide new and useful stripper means adapted for use in connection with mechanical cotton pickers.

A further object of the invention is to provide such means which include stripper bar units comprising a pair of spaced apart stripper bars firmly mounted in a resilient mount.

A further object of the invention is to provide such a device in which the resilient mount is formed of resilient rubber-like material.

A further object of the invention is to provide such a device in which the stripper bars of each of the units are disposed diagonally relative to the resilient mount in which each of the bars is embedded so that the bars diverge away from the mount into which they are connected.

A further object of the invention is to provide such a device in which the stripper bar unit, including a resilient mount and a pair of stripper bars connected thereto, is attached by means which include a holder plate which is interposed between the two stripper bars, and which is clampingly attached to a mounting bar carried by the cotton picker device.

A further object of the invention is to provide such a device in which an elongated imperforate shield is attached to an elongated vertical post support, and extends from the post support into adjacency with the stripper bar units so as substantially completely to block the flow of air through any space between the stirpper bar units and the supporting posts; and A further object of the invention is generally to improve the design, construction and efficiency of cotton picker stripper means adapted for use in cotton picker machines.

The means by which the foregoing and other objects of the present invention are accomplished and the manner of their accomplishment will be readily understood from the following specification upon reference to the accompanying drawings, in which:

FIG. 3 is a top plan view on an enlarged scale and partly in section, particularly illustrating one of the stripper units and its related parts.

FIG. 4 is a fragmentary longitudinal sectional view taken as on the line IV—IV of FIG. 2, and on the scale of FIG. 3.

FIG. 5 is a fragmentary transverse sectional view taken as on the line V—V of FIG. 2, and on the scale of FIGS. 3 and 4.

FIG. 6 is a top plan view similar to FIG. 3 illustrating variation in the construction of the device.

Figure 1:
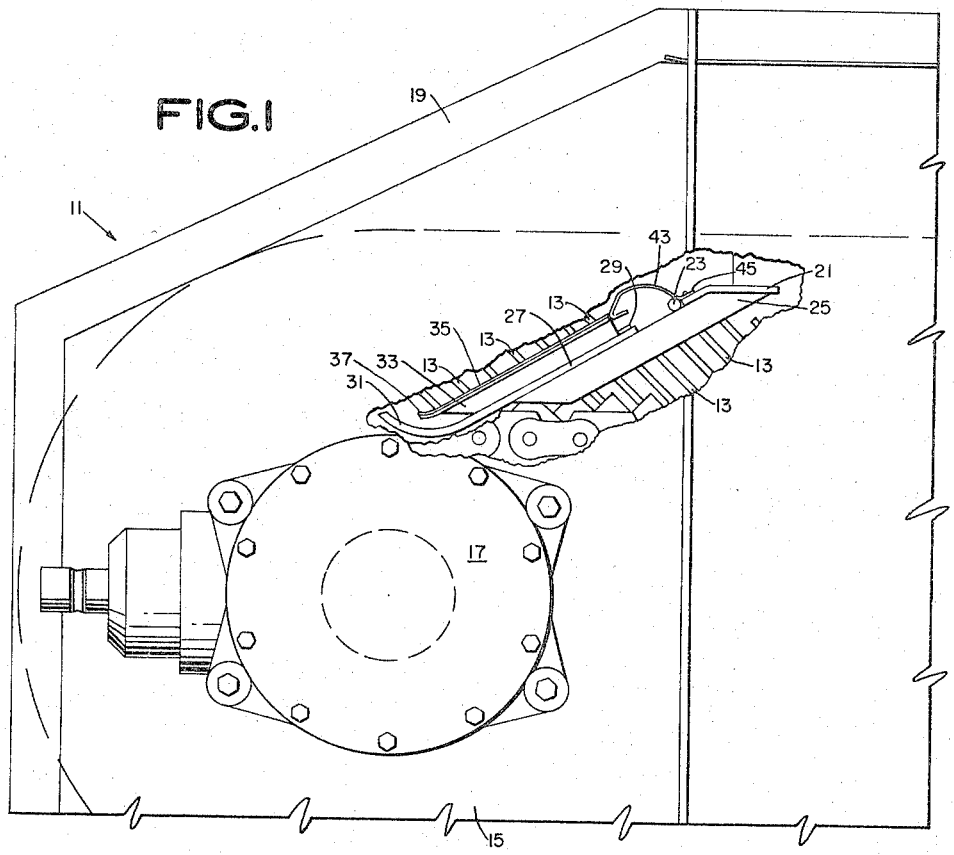
FIG. 1 is a fragmentary top plan view, with parts broken away for purposes of illustration, of a portion of a cotton picker unit showing the preferred location of the stripper means of the present invention.

Referring now to the drawings in which the various parts are indicated by numerals, the present invention is adapted particularly to be used in conjunction with a cotton picker unit 11, which is of the type employing a plurality of rotatable rod-like spindles 13 arranged in horiontal rows and vertical banks for movement by the unit 1 into and through the cotton row so as to engage with the cotton lint presented by the cotton plants in the row to remove the same therefrom by spindle attack thereon, winding the lint onto the spindles. These rotating spindles 13 are driven rotationally in a manner which is well known in the art and which need not here be detailed.

After the spindles have attacked the cotton and removed the lint, it is desirable for the cotton lint to be removed from the respective spindles, and for that purpose strippers have heretofore been provided through which the spindles have been passed in a comb-like action so as to scrape from the spindles the acumulated lint.

The picking phase of the spindles 13 is normally accomplished along the picking side 15 of unit 11 as the spindles 13 move from front to rear along that side of the picking unit, and after the spindles leave the picking side of the unit they pass rearwardly and around rear sprockets 17 forming part of the drive means, so as to be driven forwardly along the so-called stripping side 19 of the unit 11 along which the stripping means are preferably disposed.

The stripper elements are preferably disposed in a position substantially adjacent to rear sprocket means 17 to remove the spindle-carried cotton as soon as is conveniently appropriate after passage around the rear portion of the picking unit 11. It will, of course, be understood that the stripper elements may be disposed at any position along the stripping side which seems most desirable.

Figure 2:
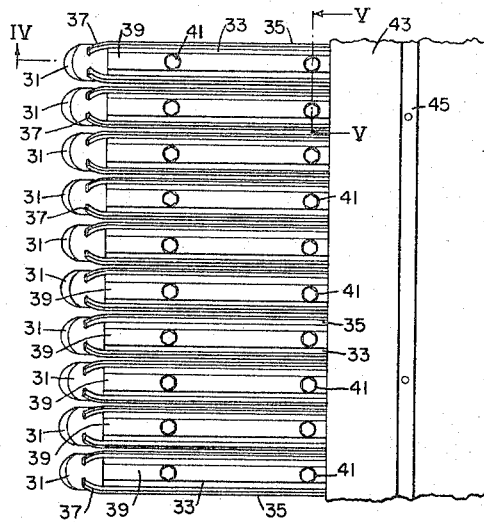
FIG. 2 is a fragmentary side elecational view illustrating a group of the stripper units of the present invention disposed in a vertical bank.

In the embodiment of the device, as shown particularly in FIGS. 1, 2 and 3 of the drawings, the stripper elements of the present invention are supported from an upright support 21, which is connected with and carried by picker unit 11 in a substantially vertical position for the purpose of supporting the stripper elements and is disposed forwardly from rear sprocket 17 at such distance and position as is desired in order to accommodate the stripper elements. Upright 21 is disposed within picker unit 11 at a position which is outwardly disposed from the path of travel of spindles 13 as the spindles are moved beyond rear sprocket means 17 into and toward the stripping side 19 of the picking unit, with the support 21 being positioned forwardly of rear sprocket means 17.

Support 21 preferably comprises a substantially plate-like member which is disposed in substantially vertical position, and which at its rearward edge has integrally secured to it a substantially rod-like element 23, rod-like element 23 extending vertically along and with the rearward edge of support 21 and providing a strengthening post for the upright support 21.

Connected to support 21 and extending rearwardly therefrom is a series of gussets 25 which are horizontally disposed and vertically spaced apart in a vertical series or bank of gusset elements. Gussets 25 provide the principal connection between support 21 and the stripper elements of the present invention. Rigidly secured to gussets 25 and in perpendicular relation thereto are mounting bars 27. Mounting bars 27 preferably terminate spaced away from support 21 and are positioned so as to engage with gussets 25 and form therewith mounting means of substantially T-shaped cross section, with the gusset forming the leg of the T and the mounting bar being secured thereto substantially along the longitudinal midline of the mounting bar. If desired, a stop block 29 may be fixed to mounting bars 27 adjacent the terminal end of the bars 27 proximate to support 21.

At the opposite or rearward end of mounting bars 27 remote from support 21, the mounting bar is continued beyond the remote end of gussets 25 in an outwardly curved guard portion 31 which extends beyond and guards the outer and rearward end of the mounting bars and of the stripper elements which are mounted upon the mounting bars, to prevent and deflect impingement against the mounting bars and the stripping elements mounted thereon by the spindles of the present cotton picking machine or other matters. As can be seen the distal end of guard portion 31 is preferably rounded in order to provide a ready guide to deflect such materials to pass between adjacent mounting bars and mounted stripper elements.

Mounted upon mounting bars 27 is the stripper base 33. Stripper base 33 is preferably formed of a rubber-like material adapted to yield to pressures in a resilient manner and urging return of itself and of instrumentalities carried thereby to original position. Stripper base 33 is seated against mounting bar 27, preferably substantially abuts stop block 29, and terminates at its end remote from the stop block within and short of guard portion 31 of the mounting bar so that guard portion 31 of the mounting bar extends beyond the end of stripper base 33 and curves around the distal end of stripper base 33.

Fixedly connected into stripper base 33 is a pair of stripper bars 35. Each of stripper bars 35 comprises a flat strip-like portion of a rigid metal, such as steel or the like. Stripper bars 35 are respectively embedded in stripper base 33 and fixedly held in position by stripper base 33.

Each of the stripper bars is at its outer edge, away from the stripper base, slightly bevelled in order to provide for edge positioning extending into the space between adjacent stripper units. Each of the stripper bars is diagonally disposed relative to its supporting stripper base so that the respective pairs of stripper bars mounted in each of the stripper bases 33 diverge away from the supporting base and in effect converge toward the next adjacent stripper bar of an adjacent stripper unit.

Stripper bars 35 extend rearwardly beyond the distal end of stripper base 33, and each of the pairs of stripper bars 35 mounted in their respective stripper bases 33 curve inwardly at their distal ends, as at 37 as best shown in FIG. 2, in order to direct the ends of the stripper bars behind the guard and guide portion 31 of mounting bar 27.

In virtue of the divergence of the stripper bars away from the mounting base, the edges of the bars 35, which are bevelled preferably, extend laterally beyond the extent of the mounting bar 27 and beyond the extent of the stripper base 33. The curved ends 37 of the stripper bars thus project beyond the extent of the mounting base and are housed behind the guard portion 31 of the mounting bar, the stripper curved ends curving inwardly into convergence behind the curved guard portion so as to enhance the deflection of any materials and/or spindles into a path between the related stripper units.

In order to attach stripper base 33 to mounting bar 27, a holder plate 39 is provided. Holder plate 39 is narrow, elongated plate which is adapted and positioned to extend substantially from the forward end of stripper base 33 adjacent to stop block 29 rearwardly to overlie substantially the extent of stripper base 33, termintaing approximately at the ditsal end of the stripper base 33 and inwardly from the curved ends of stripper bars 37 which are carried by stripper base 33. Holder plate 39 engages against stripper base 33 and is interposed between the stripper bars 35 so that the stripper bars extend longitudinally in the stripper unit alongside the holder plate 39. Attachment of the elements together is accomplished by bolts 41 which extend through holder plate 39, stripper base 33, and into suitable threaded sockets in mounting bar 27.

Upon increased tightening of bolts 41 against holder plate 39, the resilient stripper base 33 is compressed, which forces a lateral expansion of the stripper base, thus moving relatively apart the stripper bars 35 carried by the stripper base 33. Similarly, upon loosening of the bolts 41, the compression upon the stripper base 33 is relieved and causes the stripper bars 35 carried by stripper base 33 to move more closely together.

When the stripper means are mounted together, the gussets 25 and mounting bars 27 affixed to the gussets are secured to upright 21. Extending diagonally rearwardly and outwardly from the support 21, the mounting bars are vertically spaced apart so as to provide a spindle passage between the respective mounting bars and, with the stripper units, comprising stripper bases 33 and affixed stripper bars 35 connected to the mounting bars as hereinbefore described, the stripper bars respectively diverging away from the stripper bases extend into the passageway between the respective mounting bar sand the next adjacent mounting bar, so that between the projecting stripper bar there is formed a passageway through which the spindles 13 are drawn after leaving rear sprocket 17 in order to remove therefrom teh cotton entwined thereupon.

As the spindles are driven toward the stripper assemblies the rounded guard portion 31 of the mounting bars together with the curved end portions 37 of the stripper bars are effective to prevent jamming of the spindles against the stripper means and deflectingly to guide the spindles through a selected passage between the stripper bars so that the cotton entwined upon the spindles may successfully be removed by the strippers.

It has heretofore been thought that the suction air which is desirable to remove the separated cotton from the collection near the stripper means should be passed through the stripper support in order to attack the released cotton. It is found that this proves substantially unsatisfactory in many respects, and in order to cure that defect and to eliminate any air vents between the stripper and the support posts, the present invention comprises, in addition, the inclusion of a vertically elongated shield 43 which is rigidly fixed to support 21 and extends rearwardly therefrom terminating in adjacency to the forward end of the stripper elements, the terminal edge of shield 43 substantially overlying stop blocks 29 which are secured to the respective forward ends of the mounting bars.

The elongated shield is preferably of arcuate conformation in cross section, and at its free edge adjacent to the stripper bars, is provided with a forwardly turned flange 45 which strengthens the vertical longitudinal extent of shield 43 and additionally serves to deflect and block overflow between the root ends of the strippers and the support. Shield 43 preferably extends substantially from top to bottom of the bank of stripper means provided by the combination hereinbefore described. The forward edge of shield 43 is preferably connected to support 21 substantially along the junction between support 21 and rod 23 adjacent the rearward edge of the upright support.

In FIG. 6 of the drawings a variation in structure is illustrated primarily concerned with the provision of a support 121 comprising a substantially plate-like member 123 and an arched member 124 rigidly fixed to member 123 and together substantially comprising support 121. To support 121 gussets 125 which vary in shape from gussets 25 heretofore described but are of essentially the same purpose and function are connected. Mounting bars 27 in FIG. 6 are connected with gussets 125 in the manner of connection to gussets 25 heretofore described, and the stripper base and stripper bar arrangement and their relationship to the mounting bar and to the guard portion 31 of the mounting bar is substantially similar to that which has heretofore been described. A vertically elongated shield 43 is connected to upright 121 in manner similar to and for a purpose substantially like that of the shields 43 heretofore described in connection with uprights 21.

In the operation of the device after its assembly in the manner which has been described, each stripper bar of each pair embedded in a stripper base 33 projects into a passageway between its support and the next adjacent support and is spaced from a similar stripper bar projecting into such passageway oppositely from the adjacent supporting means. The spacing between the edges of the stripper bars may if and when desired be adjusted by manipulation of bolts 41 to adjust the compression upon the stripper base 33 so as to move the stripper bars either outwardly toward adjacent bars or to move them inwardly somewhat away from adjacent stripper bars and thus to establish a passageway between the edges of the stripper bars to the desired position.

It is preferred that the stripper bars be established in a position so that the edges of the stripper bars are spaced apart in excess of the maximum cross sectional dimension of the spindles 13 in order that the spindles may freely pass between the bars, enabling the bars to attack the cotton wound upon the spindles and to remove the same therefrom without wearing upon the spindles themselves.

It is found that in the event of a heavy accumulation of lint upon spindles 13 the bars will tend to be pulled by the force toward the spindles, the resilient mounting of stripper base 33 enabling the stripper bars to move thus inwardly and to accommodate to the conditions occurring at that time, and upon release of those conditions moving the stripper bars back to the original adjusted position of the stripper bars relative to the stripper base and the mounting means. In other circumstances it is found that excess means may cause the stripper bars to be forced somewhat apart and the resilience of the stripper base will enable the bars to move somewhat apart when this condition occurs and will effect return of the bars to the desired established original position.

It is further found that the substantially complete blocking of the flow of air between the root ends of the stripper means and the support members effected by shields 43 eliminates an unnecessary and undesired turbulence in the stripped cotton and enables the suction means of the picking unit much more effectively to remove the stripped cotton from the collection section adjacent to the stripper means than has formerly been possible where substantial air vents have been provided in conjunction with the root ends of the stripper means.

Support 121, as illustrated in FIG. 6, is desirable in connection with units of varying sizes to provide the necessary support, as for example in the case of an increased height unit in which a substantial increase is made in the number of spindle units to be encountered by the stripping means, therefore a corresponding increase in the quantity of the stripping means.

It will be observed that the width of the holder plate 39 is preferably less than the minimal spacing between stripper bars 35 at their toed-in base edges which are mounted in the stripper base.

I claim:

1. Stripper means for use in a cotton picking machine, which machine includes horizontally disposed rows of picking spindles driven in a continuous path along a picking side to attack and withdraw the cotton from the cotton plans, thence along a stripping side for removal of the withdrawn cotton from the spindles, said stripper means positioned on said stripping side for removing said withdrawn cotton from said spindles comprising support means mounted uprightly within said machine, a plurality of mounting bars, means connecting said mounting bars to said support means in substantially horizontal, vertically spaced relation, the spaces between said mounting bars providing passages for said spindles along said stripping side, a like plurality of stripper units, each said stripper unit comprising a stripper base of yieldable rubber-like material held against the inner face of a said mounting bar, holder means attaching said base to said mounting bar including a plate member extending along said base, means clamping said holder plate to said mounting bar with said yieldable base between said holder plate and said mounting bar, a pair of stripper bars embedded in each said base alongside said holder plate, said stripper bars extending from said base toward and into said passages engaging withdrawn cotton carried on spindles passing through said passages to remove said withdrawn cotton from said passing spindles.

2. Stripper means in accordance with claim 1, in which said stripper bars are angularly disposed relative to said base and flaringly diverge toward and into said passages.

3. Stripper means in accordance with claim 1, in which said stripper bars extend beyond the end of said base remote from said support means.

4. Stripper means in accordance with claim 1, in which said mounting bar extends beyond the ends of said base and said stripper bars and is arcuately curved guarding said ends and guiding spindles into said passages.

5. Stripper means in accordance with claim 3, in which the ends of said stripper bars beyond said base end curvingly converge to guard the base end.

6. Stripper means in accordance with claim 1, in which a vertically elongated shield is connected to said support means and extends substantially to the ends of said stripper units proximate to said support means, said shield substantially completely blocking flow of air between said stripper units and said support means.

7. Stripper means for use in a cotton picking machine which includes horizontally disposed rows of picking spindles driven in a continuous path along a picking side to attack and withdraw the cotton from the cotton plants, thence along a stripping side to remove the withdrawn cotton from the spindles, said stripper means positioned on said stripping side for removing said withdrawn cotton from said spindles comprising support means mounted uprightly within said machine, a plurality of mounting bars, means connecting said mounting bars to said support means in substantially horizontal, vertically spaced relation, the spaces between said mounting bars providing passages for said spindles along said stripping side, a like plurality of stripper units, each said stripper unit comprising a stripper base of yieldable rubber-like material held against the inner face of a said mounting bar, holder means attaching said base to said mounting bar including a plate member extending along said base, means clamping said holder plate to said mounting bar with said yieldable base between said holder plate and said mounting bar, a pair of stripper bars embedded in each said base alongside said holder plate, said stripper bars being angularly disposed relative to said base and flaringly diverge toward and into the said passages, the ends of said stripper bars of each pair of stripper bars remote from said support means extending beyond the end of the base in which said pair is embedded and curvingly converging to guard the end of said base, the end of said mounting bar remote from said support means extending beyond the end of said base and the converging ends of said stripper bars and arcuately curved overlying and guarding the converging ends of said stripper bars, said stripper bar ends and said curved mounting bar end guiding spindles into said passages, and a vertically elongated shield connected to said support means and extending substantially to the ends of said stripper units proximate to said support means, said shield substantially completely blocking the flow of air between said stripper units and said support means.

8. Stripper means for use in a cotton picking machine which includes horizontally disposed rows of picking spindles driven in a continuous path along a picking side to attack and withdraw the cotton from the cotton plants, thence along a stripping side to remove the withdrawn cotton from the spindles, said stripper means positioned on said stripping side for removing said withdrawn cotton from said spindles comprising support means mounted uprightly within said machine, a plurality of mounting bars, means connecting said mounting bars to said support means in substantially horizontal, vertically spaced relation, the spaces between said mounting bars providing passages for said spindles along said stripping side, a like plurality of stripper units, each said stripper unit comprising a stripper base of yieldable rubber-like material held against the inner face of a said mounting bar, holder means attaching said base to said mounting bar including a plate member extending along said base, means clamping said holder plate to said mounting bar with said yieldable base between said holder plate and said mounting bar, a pair of stripper bars embedded in each said base alongside said holder plate, said stripper bars being angularly disposed relative to said base and flaringly diverge toward and into the said passages, the ends of said stripper bars of each pair of stripper bars remote from said support means extending beyond the end of the base in which said pair is embedded and curvingly converging to guard the end of said base, the end of said mounting bar remote from said support means extending beyond the end of said base and the converging ends of said stripper bars and arcuately curved overlying and guarding the converging ends of said stripper bars, said stripper bar ends and said curved mounting bar end guiding spindles into said passages.

References Cited by the Examiner

UNITED STATES PATENTS

| | | | |
|---|---|---|---|
| 1,946,741 | 2/1934 | Hamme | 56—41 |
| 2,629,221 | 2/1953 | Rust | 56—41 |
| 2,665,535 | 1/1954 | Rust | 56—41 |
| 2,671,298 | 3/1954 | Fergason | 56—14 |
| 2,691,265 | 10/1954 | Fergason | 56—41 |
| 2,798,352 | 7/1957 | Gray | 56—41 |

ABRAHAM G. STONE, *Primary Examiner.*

RUSSELL R. KINSEY, *Examiner.*